S. Staples,
Wood Clamp.
N° 10,343.   Patented Dec. 20, 1853.

UNITED STATES PATENT OFFICE.

SOLON STAPLES, OF TOPSHAM, MAINE.

SCREW FOR PLANKING SHIPS.

Specification of Letters Patent No. 10,343, dated December 20, 1853.

*To all whom it may concern:*

Be it known that I, SOLON STAPLES, of Topsham, in the county of Lincoln and State of Maine, have invented a new and useful Machine for the Purpose of Bringing the Planks Used in Shipbuilding to their Proper Place and Position in Order to be Spiked to the Timbers.

The title of the machine is "Staples' self-holding planking-screw;" and I do hereby declare that the following is a full and exact description thereof, reference being had to the accompanying drawings and to the letters of reference marked thereon.

The nature of my invention consists in bringing the planks used in ship-building to their proper position for being spiked to the timbers by a better method than heretofore used.

Figure 1:
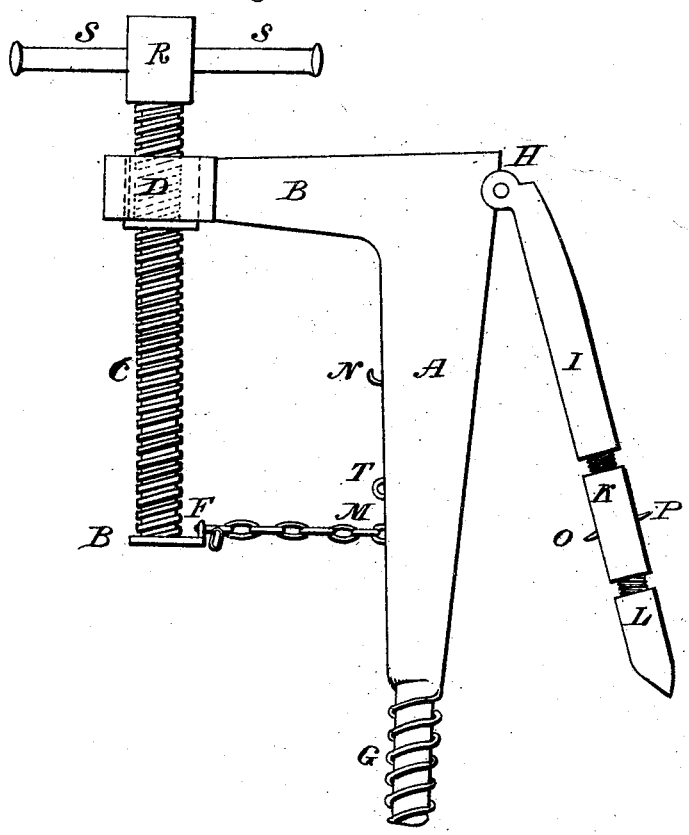
Figure 2:

In the drawings, Figure 1, presents a view of the whole machine, and Fig. 2, presents a view of the side of the brace different from that shown in Fig. 1.

The same letters in the figures represent the same parts of the machine.

The machine consists of a piece of iron having a long arm called the shank, and marked A in Fig. 1, and a shorter arm, at right angles to the shank, and which is marked B in Fig. 1. Near the end of the short arm is a male screw about fifteen inches long, and marked C in said Fig. 1, which screw is inserted in a female screw cut through a circular enlargement of the end of the short arm, which enlargement is represented in said figure by D, and an enlarged head of the screw C is represented by R, through which head is a hole in which slides a lever or handle marked S. At the end of said male screw is a flat circular plate, as represented at E, which plate swivels on a pivot at the extreme end of the screw. The circular plate has a hook or ear, shown at F, for the chain to hook on. The extremity of the shank is cut into a screw, G, about five inches in length for the purpose of holding the machine securely during the operation hereafter described. There is attached to the shank a piece termed the brace, connected with the shank by a joint near the angular corner of the machine. The extremity of the brace bears upon the side of the vessel for the purpose of preventing the action of the screw C from forcing the shank from its proper position. The connection of the brace with the shank is shown at H. In the same figure the brace is represented by I, K, L; K being an intermediate piece with right and left hand screws at its extremities working in female screws in I and L. The purpose of this arrangement is to adjust the bearing of the brace against the side of the vessel.

In Fig. 1, M represents a chain attached to the inner part of the shank for the purpose of supporting the screw C, while driving in wedges as hereafter described, during which operation of wedging the chain is connected with the circular plate E, as shown in the figure.

At N, Fig. 1, is shown a hook for the chain to be connected when not in connection with the plate E.

In Fig. 1, L represents the part of the brace the end of which bears upon the side of the vessel.

At O and P are shown two pins for the purpose of conveniently operating the screws at the extremities of K. In Fig. 2, the end of one of the pins is shown at O, and H represents the end of the brace which is connected with the shank; and the other end of the brace is shown with teeth to retain it in place on the side of the vessel when rightly adjusted.

The action of the machine may be described as follows: The screw G is screwed into a screw-hole in a timber above the plank about to be spiked to the vessel. The said screw-hole is to be at a suitable distance from that end of the plank which is to be first spiked, and to be so far above the edge of the plank which is to be forced by wedges, as it is usual to have holes for set-bolts now in use for a similar purpose. The short arm is to be turned out of the way, to allow the plank, after its end is spiked, to be sufficiently bent to come within the range or the screw C, after said arm shall have been restored to a position to act on the plank. The brace is then to be forced against the side of the vessel. One end of the plank is then to be spiked to the timbers and partially bent; the short arm, which has previously been turned away, is then to be restored to a position for its screw to act on the plank, against which said screw is then to be forced by turning the sliding handle S. After the plank is brought sufficiently in contact with the timbers, the shank is to be used as a set-bolt, between which and the edge of the plank are to be inserted wedges for the purpose of bringing the opposite edge of the plank into close contact with the edge of the adjoining plank against which it is forced by the wedges. During this operation of setting the plank edgewise, the chain is to be connected with the circular plate in order to support the screw C. When the screws are sufficiently driven, and the plank in a proper position to be spiked, it is to be spiked accordingly, and the machine is to be adjusted to another place on the timbers, in order to proceed to another and similar operation, on another part of the plank.

I have named certain dimensions, but I do not intend to limit myself to any specific dimensions, as machines of different dimensions may be required for different vessels, or for different places on the same vessel.

I have also stated that the screw of the shank is to be placed above the plank to be spiked, but it may be, and sometimes is, placed below said plank, but the operation is substantially the same as when placed above. The chain is to be attached to the shank at such distance from the screw on the shank, as to admit the thickness of ordinary plank between the chain and said screw. When thicker plank is used the chain may be hooked into eyes placed higher on the shaft A as at T.

I do not claim the use of screws generally in planking vessels, but—

What I claim as my invention, and desire to secure by Letters Patent, is—

The combination of the shank A, its arm B and screw G, with the brace I, K, L, screw C and chain M, constructed and combined substantially in the manner, and for the purposes described.

SOLON STAPLES.

Witnesses:
WILLIAM H. LUNTS,
JOHN A. THOMPSON.